(12) United States Patent
Stroh et al.

(10) Patent No.: US 8,608,037 B2
(45) Date of Patent: Dec. 17, 2013

(54) MODULAR ARTICLE SUPPORT DEVICE

(76) Inventors: William Stroh, Jenkintown, PA (US); Jan Stroh, Jenkintown, PA (US)

( * ) Notice: Subject to any disclaimer, the term of this patent is extended or adjusted under 35 U.S.C. 154(b) by 93 days.

(21) Appl. No.: 13/245,240

(22) Filed: Sep. 26, 2011

(65) Prior Publication Data

US 2012/0104061 A1 May 3, 2012

Related U.S. Application Data

(60) Provisional application No. 61/407,240, filed on Oct. 27, 2011.

(51) Int. Cl.
*B60R 7/00* (2006.01)
(52) U.S. Cl.
USPC ........... 224/276; 224/560; 224/548; 224/553; 108/44
(58) Field of Classification Search
USPC ......... 224/276, 560, 277, 545, 548, 553, 555, 224/564; 403/61, 80; 108/42, 44, 45; 248/441.1, 444, 447.1, 447.2, 453, 460
See application file for complete search history.

(56) References Cited

U.S. PATENT DOCUMENTS

| | | | | |
|---|---|---|---|---|
| 2,150,709 A | * | 3/1939 | Bake | 281/45 |
| 3,603,274 A | * | 9/1971 | Ferdinand et al. | 108/108 |
| 3,739,478 A | * | 6/1973 | Elenberger | 33/431 |
| 4,453,788 A | | 6/1984 | Russell | |
| 4,915,035 A | | 4/1990 | Clark et al. | |
| 4,934,077 A | * | 6/1990 | Gerlach | 40/730 |
| 5,456,440 A | * | 10/1995 | Sideris | 248/458 |
| 5,487,521 A | * | 1/1996 | Callahan | 248/441.1 |
| 5,511,493 A | | 4/1996 | Kanehl, Jr. | |
| 5,542,314 A | | 8/1996 | Sullivan et al. | |
| 5,722,586 A | * | 3/1998 | Hansen | 108/44 |
| 5,845,585 A | | 12/1998 | Meeus et al. | |
| 6,148,738 A | * | 11/2000 | Richter | 108/44 |
| 7,017,878 B2 | | 3/2006 | Guo et al. | |
| 7,216,789 B2 | | 5/2007 | Caradimos | |

* cited by examiner

*Primary Examiner* — Adam Waggenspack
(74) *Attorney, Agent, or Firm* — Daniel Boudwin; Global Intellectual Property Agency, LLC

(57) ABSTRACT

An article support device for attachment to an automobile steering wheel is provided for the purpose of supporting an open book, magazine, tablet computer or the like. The device comprises a supportive body, a shelf member, a shelf lip and a securing means. The shelf member is rectangular, having a height similar to the diameter of a steering wheel. A plurality of slots on the body provide for modular securement of a shelf member. A shelf lip is secured to the outer edge of said shelf member and extends upward to restrain movement of items placed thereupon. The device is secured by a pair of hooks that fit over the top of a steering wheel, or alternatively the hooks may be utilized as a support stand to support the device in an upright position on a flat surface.

9 Claims, 3 Drawing Sheets

MODULAR ARTICLE SUPPORT DEVICE

CROSS REFERENCE TO RELATED APPLICATION

This application claims the benefit of U.S. Provisional Application No. 61/407,240 filed on Oct. 27, 2010, entitled "Book Hook Plus."

BACKGROUND OF THE INVENTION

1. Field of the Invention

The present invention relates to an article holder. More specifically, the present invention pertains to an article support device that is particularly suited for attachment to an automobile steering wheel or for use as an article stand on a flat surface.

Many individuals spend a great deal of time parked in their vehicles while on lunch breaks, between jobs, waiting for their children and the like. During this time, they may want to eat a meal, read a book, do work or partake in another activity that utilizes this free time. However, it can be difficult to balance a book, magazine, sandwich or other item directly on a vehicle steering wheel or on one's lap. Drivers may further have difficulty locating a flat surface in a vehicle to rest their belongings upon. The present invention provides a working surface and support device that enables a user to secure items on a steering wheel. The working surface rests against the steering wheel while a ledge vertically supports items placed thereon. The device may also be utilized outside of an automobile, in the home or office for instance, thereby offering users a device to support articles in several situations utilizing the same device.

2. Description of the Prior Art

A variety of devices have been created that attach to different parts of a vehicle and provide a support means for books, laptops, food or drinks. Article support devices often provide a small support shelf for the book to rest on or a pair of clamps for holding the book in place. Laptop holders offer larger shelf portions; however such shelves are typically angled away from the user for ergonomic reasons. These devices are therefore unsuitable for retaining food and drink items because they do not provide a stable, horizontal shelf that is capable of securing of such items. Additionally these devices do not feature modular mounting elements that would enable the device to be used in a freestanding position while continuing to support articles on a flat working surface.

Food holding devices have been created to address the need for horizontal support of such items. These typically provide an adjustable table member for placing food and beverages upon. These devices lack a back portion adapted for supporting a book, magazine or tablet computer and are therefore unsuitable for both uses. A device is needed that is adapted to provide a user with support of a book, magazine, tablet computer, or the like, and retain food and drink items with limited risk of such items falling onto the floor or a user's lap.

The prior art contains a variety of article support devices for automobiles. These devices have familiar design and structural elements for the purposes of maintaining a book or magazine in an upright position for an automobile user to read; however they are not adapted for the task of holding food and drink simultaneous to the display of a book or magazine. They are also not adapted to perform this task in a freestanding position on a flat surface such as a table or desk using the same attachment elements as used to secure the device to a steering wheel.

Caradimos, U.S. Pat. No. 7,216,789 discloses a steering wheel workstation support provided for mounting a laptop computer. The steering wheel workstation support contains a support portion with a lip, a hook arrangement, and a standoff member integrally formed from a single piece of material. The support portion lip secures the laptop base and is not height adjustable. The hook arrangement attaches the workstation support to the steering wheel. The standoff member, located on the back of the support portion, causes the lower end of the support portion to be displaced from a lower part of the steering wheel so as to present the laptop keyboard and display at ergonomically desirable angles. In addition, the workstation support may be placed on a horizontal surface so as to present the laptop display to viewers. The workstation support of Caradimos includes a standoff member that positions the device at a larger angle to the steering wheel than the present invention. This increased incline is undesirable for placing drinks and food items upon, which may fall over and spill due to the angle of incline. The standoff member allows the device to be utilized on a table or desk by providing a support for the device to rest on, however the standoff member is not adjustable to allow a user to vary the vertical pitch of the device.

Sullivan et al, U.S. Pat. No. 5,542,314 discloses a skeletal computer support device which has: (a) rigid side rails against which the data processing unit of the computer rests, (b) rests at the lower ends of the side rails on which the data processing unit is seated, and (c) hooks at the upper ends of the side rails for connecting the device in an easy to affix and remove fashion to a vehicular steering wheel with the computer keyboard readily accessible to, and comfortable to use by, an occupant of the vehicle. Upper and lower crosspieces integrate the side rails into a rigid inflexible structure. The lower ends of the side rails do not have adjustable height. Restraints at the ends of the lower crosspiece keep the computer from shifting from side-to-side while it is being used. The skeletal frame structure of Sullivan's laptop support is inappropriate and undesirable for use in supporting non-rigid magazines and food & drink items. Such items may easily fall and spill on the floor of an automobile or in a user's lap if not properly supported by a solid backing.

Richter, U.S. Patent No. 6,148,738 discloses a laptop table adapted to be mounted on a steering wheel, a basic body has at one end spaced hooks forming a support structure for supporting the base body on the steering wheel. The table is mounted on the base body so as to be height adjustable and pivot structure is provided for pivotally supporting the table on the base body and locking it in a particular angular pivot position with respect to the base body. The laptop support member of Richter is flexible and angles downward away from the body of the device. Richter does not disclose a shelf lip disposed along the free end of the support member that would prevent items from sliding off of the supporting member surface. This structure is undesirable for the placement of books or magazines upon, as they would be otherwise unsupported. Similarly, the supporting member is unsuitable for the placement of beverages and food, since they would also slide down the incline and onto the lap of a user.

Meeus, U.S. Pat. No. 5,845,585 discloses a device with supporting tray adapted for mounting on the steering wheel of a vehicle, comprising: (a) a rigid panel with two parallel folding lines so as to divide the panel in three parts, namely a first central part, a second part with an opening and a third part, the opening being adapted for being moved downwards so that the wheel partly passes through the opening and so that edges of the opening are supported by the wheel, and (b) a link for linking the third part and the first part together so as to maintain the third part substantially horizontal. Meeus does not disclose a third part of the device having a shelf lip disposed along its free edge. The lack of a restraining structure makes Meeus undesirable for use as a book holder since the edges of books may slide forward and fall without the support provided therefrom. Additionally, the lack of a shelf lip may result in food falling onto a user's lap or onto the floor. Meeus also fails to contemplate the use of hooks for attaching the device to a steering wheel. The supporting tray of Meeus does not provide height adjustability as provided in the present invention.

Clark, U.S. Pat. No. 4,915,035 discloses a novel compact and rigid food-serving tray horizontally attached to an automobile steering wheel at any elevation regardless of the steering wheels inclination to the vertical. The tray being supported on the steering wheel by two right angle frames slidably engaging longitudinal slots on each side of the bottom of the tray. The transverse portions of the frames are inwardly turned towards each other and have means for adjusting the spacing therebetween. While the device may be vertically adjusted with respect to the steering wheel, Clark does not disclose the tray member being height adjustable with respect to the device. A leak-proof beverage container well is located on the front center of the tray for holding cans, bottles, glasses and so forth. Clark does not disclose a back member for supporting a book or magazine, nor does it disclose a pair of hooks for attaching the device to a steering wheel.

Kanehl, Jr., U.S. Pat. No. 5,511,493 discloses a table for supporting objects within a vehicle. The inventive device includes a pair of mounting brackets securable to a door or seat of the associated vehicle. A table member is coupled to the mounting brackets by an adjustment assembly, which permits vertical movement of the tray relative to the brackets. The device of Kanehl is intended for use with a seat or door, not a steering wheel. Kanehl does not disclose a backing member that would allow a book or magazine to rest thereupon.

Russell, U.S. Pat. No. 4,453,788 discloses a portable writing desk is the subject of the present invention. The desk is particularly designed for use on a vehicle steering wheel. A flat surface is provided for resting against the steering wheel and a plurality of hooks extend from the surface for engagement over the rim of the wheel. A writing surface is disposed in spaced relationship to the flat surface and is inclined in the same direction as the steering wheel. The writing surface is hinged so as to provide access to an inner cavity, which holds papers, writing instruments, etc. The writing desk is not height adjustable with respect to the steering wheel. The portable writing desk may also be used in the lap of a person or on a flat planar surface and, in this manner, provides for an incline writing surface that is comfortable and convenient. The device of Russell does not disclose a portion that supports the bottom edge of a book or magazine, or one that allows food and drinks to be placed thereupon. Russell also does not disclose a shelf lip disposed along the lower edge of the table that would reduce the risk of falling from the table surface.

Guo et al, U.S. Pat. No. 7,017,878 discloses a book holder for use with an automobile steering wheel that is not only fastened to the rim of an automobile or truck steering wheel so as to hold printed matter and various electronic devices, but also is foldable to smaller size for storage. The book holder can also be used as a desk to read and write on it and can be installed or removed from the steering wheel within seconds. This book holder includes two built-in elastic bands to prevent unexpected book turning pages and two elastic loops for holding the pens. Guo does not disclose a lower portion that extends from a first side of the device to a second. It also does not disclose a shelf lip member for preventing books, food, and other items from falling from the lower portion. The shelf of Guo pivots upward towards the upper portion but is not modularly height adjustable.

None of the above mentioned prior art devices disclose the use of securing hooks that are pivotally adjustable to provide support for the device in a free-standing position or while in a stationary vehicle. The devices disclosed by the prior art similarly fail to address the need for a steering wheel-mounted article stand that is adapted to support food and drink items. The current invention relates to a device for retaining a book or magazine in an upright position while allowing food or drink items to be simultaneously supported, in either a steering wheel supported configuration or in a freestanding position. It substantially diverges in design elements from the prior art; consequently it is clear that there is a need in the art for an improvement to the existing steering wheel article support devices for automobiles. In this regard the instant invention substantially fulfills these needs.

SUMMARY OF THE INVENTION

In view of the foregoing disadvantages inherent in the known types of article support devices now present in the prior art, the present invention provides a new supportive shelf adapted to retain the lower edge of a book, as well as food and drink items, wherein the same can be utilized for providing convenience for the user when reading a book and eating a snack while seated in an automobile or while seated at a flat working surface. The device comprises a supporting body, a shelf member, a shelf lip, and a securing means. The supporting body has an overall rectangular shape and has a height approximately equivalent to the diameter of a steering wheel. This supporting body serves as the primary support surface for the binding and pages of a book or magazine, the back of a tablet PC or other device desired to be supported in a position viewable by a user seated in the driver's seat of a vehicle.

The securing means is affixed to the back of the supporting body and secures the device to an upper portion of an automobile steering wheel. The securing means preferably comprise a pair of hooks to provide secure connection between the device and the steering wheel. The hooks are attached to the supporting body directly or by sliding rails that permit the hooks to adjust vertically, thereby increasing or decreasing the distance between the top of the supporting body and the top of a steering wheel. The securing hooks are pivotable, allowing their rotation from a wheel attachment configuration into a self-supporting configuration, wherein the hooks act to brace the upright supporting body on a flat working surface. When so positioned, the securing hooks provide a support structure for the device resting on a table surface. In this manner the hooks serve a dual purpose of securing the device to an automobile steering wheel and supporting the device when it rests on a flat surface in an upright, freestanding position.

A shelf is perpendicularly and removably secured to the supporting body and extends outwardly towards a user. A plurality of engagement slot pairs are disposed along the top, middle, and lower portions of the supporting body so that the shelf member may be removably secured to the same by engaging any of the slot pairs.

The modularity of the shelf member allows a user to adjust the position of the shelf according to the user's preference, increasing or decreasing the height along the backing member, of articles placed on the shelf member. Brackets may be used to secure the shelf to the supportive body. The shelf lip is secured to the outer edge of the shelf and extends upwards therefrom. The shelf and shelf lip combination is adapted to allow a book or other article to rest thereupon, while restraining articles on the shelf from any transient motion that would cause dislodgement. Food and drink items may also be placed on the shelf, wherein the shelf lip provides a restraining means and reduces the risk of food and drink items falling from the shelf and onto a user or the floor. In an alternative embodiment, the brackets used to secure the shelf to the body may have an adjustable pitch to accommodate different sizes of steering wheels.

It is therefore an object of the present invention to provide a new and improved steering wheel article support device for automobiles having all the advantages of the prior art and none of the disadvantages.

Another object of the present invention is to provide a new and improved article support device for an automobile steering wheel having a shelf lip attached to a shelf in order to restrain the movement of items resting thereupon.

Yet another object of the present invention is to provide a new and improved article support device having a shelf of sufficient width and depth to accommodate the lower edge of a book in addition to food and drink items.

Still another object of the present invention is to provide a new and improved article support device for automobiles whereby a pair of securing hooks may be rotated from a steering wheel support position to a freestanding support position, wherein the device may be supported on a flat surface such as a table or desk in an upright position.

Another object of the present invention is to provide a new and improved article support device having a modular shelf that is removably securable at positions of differing height to a supporting body member.

Still another object of the present invention is to provide a new and improved article support device having resilient and durable construction.

Other objects, features and advantages of the present invention will become apparent from the following detailed description taken in conjunction with the accompanying drawings.

BRIEF DESCRIPTIONS OF THE DRAWINGS

The above invention will be better understood and the objects set forth above, as well as other objects not stated above, will become more apparent after a study of the following detailed description thereof. Such description makes use of the annexed drawings wherein like numeral references are utilized throughout.

DETAILED DESCRIPTION OF THE INVENTION

Figure 1:
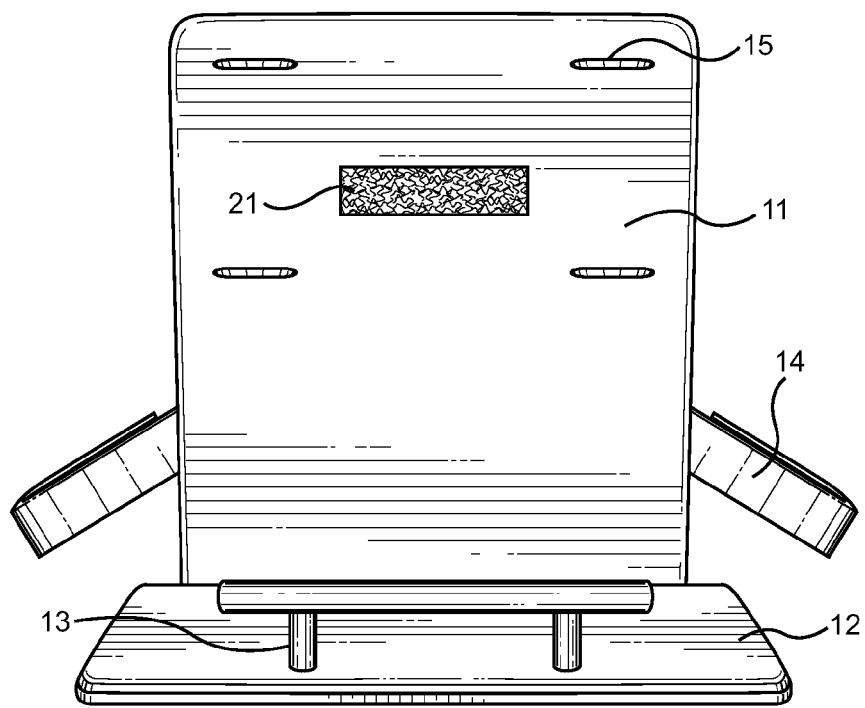
FIG. 1 shows the article support device according to the present invention while in a freestanding position.

Reference is made herein to the attached drawings. Like reference numerals are used throughout the drawings to depict like or similar elements of the article support device for automobiles. For the purposes of presenting a brief and clear description of the present invention, the preferred embodiment will be discussed as used for displaying books or magazines while supporting food and drink items. This is for representative purposes only and should not be considered to be limiting in any respect.

Referring now to FIG. 1, there is shown an article support device for an automobile. The device comprises a supportive body 11, a shelf member 12, a shelf lip 13, and a securing means 14. The supportive body 11 has a height approximately equivalent to the diameter of an automobile steering wheel. The shelf member is removably secured at a perpendicular angle to said supportive body. A shelf lip 13 is disposed along the outer edge of said shelf member. This shelf lip 13 restricts movement of items placed upon the shelf member and thereby reduces the risk of items falling onto a user. The device may be removably secured to a steering wheel by the securing means, which comprise a pair of hooks. Alternatively, and as shown in FIG. 1, the device may be supported in a freestanding configuration wherein the hooks 14 are rotated to provide support for the backing member 11 in an upright stance, allowing support for articles on a flat working surface.

Mounting brackets are used to removably secure the shelf member 12 to the supporting body 11. The shelf is secured by a pair of upstanding "L" brackets that may be removably mounted to engagement slots 15 disposed in pairs along an upper portion, middle portion and lower portion of the supporting body. The "L" brackets are inserted through a pair of engaging slots 15 to removably secure the shelf member to the supporting body in three distinct locations. When articles are placed on the shelf member, the weight of the articles creates a downward force on the shelf that causes the inserted portion of the "L" brackets to bear against the rear surface of the supporting body while the shelf inner ledge bears against the front surface of the supporting body, thereby holding the shelf member in position. A user may adjust the height of the shelf member by utilizing a different pair of engaging slots to secure the shelf to the supporting body. In an alternate embodiment, the shelf may be secured to the supportive body by brackets having an adjustable vertical pitch, so that the angle between the shelf and supportive body may be changed to facilitate the optimal holding of beverage and food items.

Along the edge of the shelf member 12 opposed to the attached "L" brackets, a shelf lip 13 is secured. The shelf lip presents a barrier that reduces the transitory movements of objects placed on the shelf surface and thus reduces the risk that articles will fall therefrom. Said shelf lip has a handle shape that may be useful for carrying the device when it is not in use. The shelf lip may be formed of two vertical posts having a crossbar extending therebetween, or it may have any one of a variety of shapes suitable for use as a handle.

A strip of hook and loop material 21 is centrally secured to the device to facilitate compact storage in a stowed position. This strip of material is centrally disposed near the middle pair of engaging slots 15. A corresponding strip of hook and loop fastening material is disposed along the underside surface of the shelf member 12. The device may be stored by removing the shelf from the supporting body and attaching the pair of hook and loop fastening material together to create a relatively flat configuration. The stowed device can then be placed in an automobile trunk, storage closet, garage or other convenient location with minimal wasted volume.

Figure 2A:
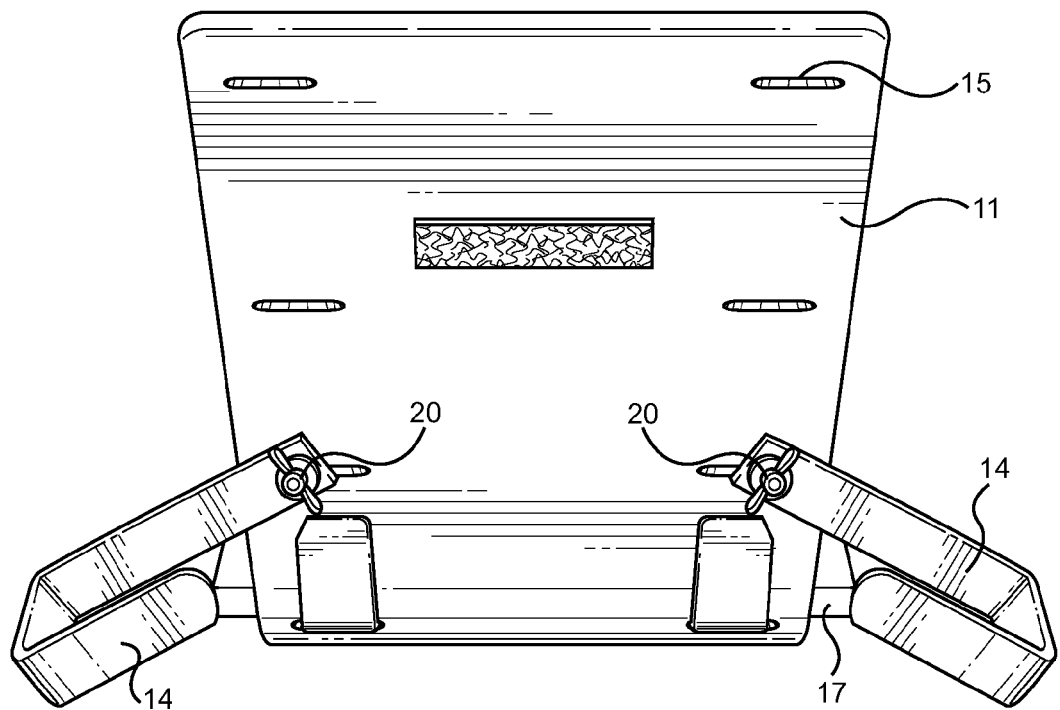
FIG. 2a shows a rear view of the article support device according to the preferred embodiment of the present invention.
Figure 2B:
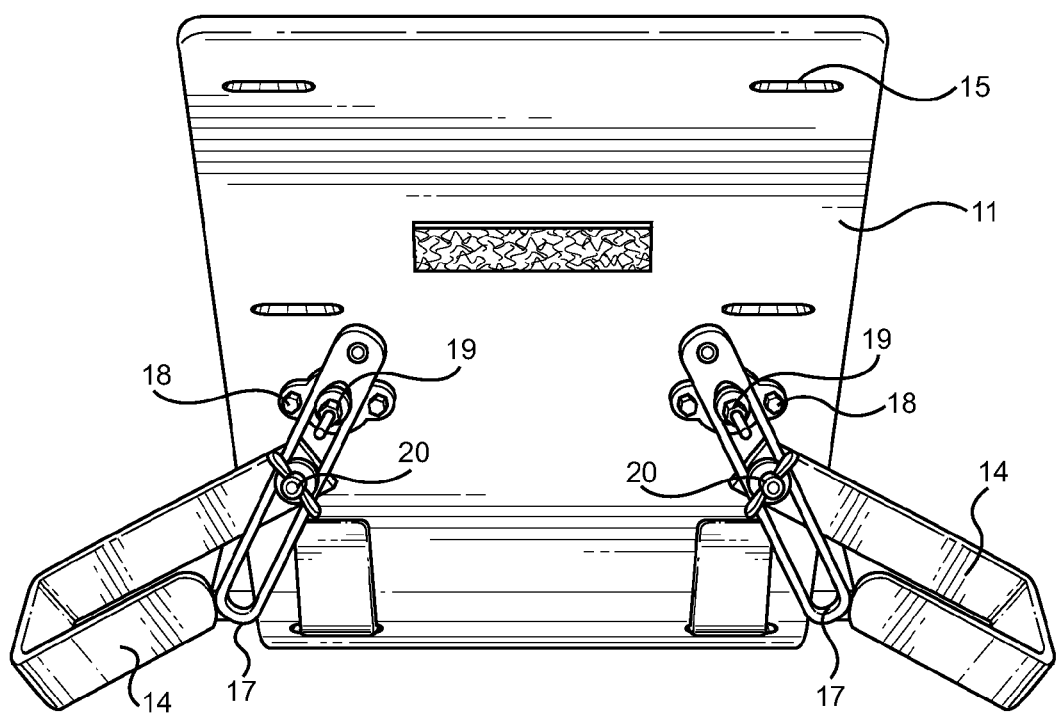
FIG. 2b shows a rear view of an alternative embodiment of the present invention, while in a freestanding position.

Referring now to FIG. 2A there is shown a rear view of the instant article support device. In a preferred embodiment, the securing hooks 14 are pivotally attached to the back of the support body 11 by wing nuts 20 that may be loosened to allow the hooks to rotate thereabout. The wing nuts may then be tightened to secure the hooks in position. In FIG. 2B there is shown an alternative embodiment, whereby the securing hooks 14 are affixed to the rear surface of the supporting body 11 by means of slide rails 17 and wing-nut fasteners 19, 20. A pair of securing brackets 18 is attached along a middle portion of the supporting body. A first fastener 19 is positioned within a lower portion of the slide rail channel and adjustably secures the rail to a bracket. A second, wing-nut fastener 20 is positioned within an upper portion of the slide rail channel and removably secures a securing hook along a length of the rail. Distance between the supporting body and the securing hooks may be increased or decreased by loosening the wing-nut fasteners 20 and sliding them along the slide rail channels, and then tightening the fasteners to secure the desired position and orientation of the hooks 14. In either embodiment, these adjustment capabilities allows a user to control the height of the supporting body on a steering wheel and the orientation on a freestanding position so that reading materials and food items may be positioned advantageously.

To provide a user with the option of utilizing the device while it rests in an upright position, the securing hooks may be adjusted to form a support structure for the device. In the alternative embodiment, the wing-nut fasteners 19 may be loosened to allow the sliding rails to pivot 360 degrees, and retightened to secure the sliding rails at a desired angle with respect to the supporting body. Once the sliding rails are secured in position, the securing hooks may be rotated about the upper fasteners 20 to pivot the hooks into a position that supports the backing member 11 in a slanted, freestanding position. The device may then be placed on a flat surface so that the securing hooks and the lower edge of the supporting body rest on said flat surface. Books, magazines, or other reading materials may be placed on the shelf where they are held at an incline. A user may adjust the positioning of the securing hooks and sliding rails to obtain an angle of incline that is advantageous for viewing of materials.

Figure 3:
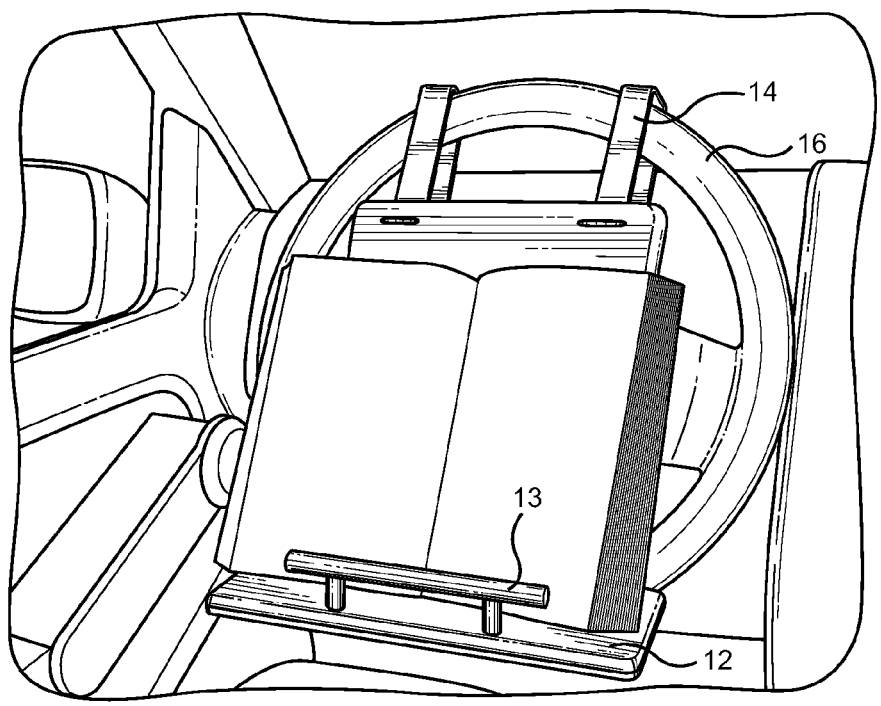
FIG. 3 shows a perspective view of the article support device according to the present invention, removably attached to a steering wheel and supporting a book article thereon.

Referring now to FIG. 3, there is shown a view of the present article support device attached to the upper portion of an automobile steering wheel 16. In a preferred embodiment, the supportive body 11 has an overall rectangular shape for supporting the spine and pages of a book or magazine, or alternatively a tablet computer. However, the shape of the supporting body may also be circular, trapezoidal, elliptical or any other geometric shape, symmetrical or asymmetrical, that is capable of providing support to articles leaned against the same. The shelf member 12 has a depth such that food and drink items may be placed on the shelf simultaneously with the placement of media articles. A shelf lip 13 prevents articles from sliding off the front edge of the shelf member to prevent articles from falling onto a user or the floor. In a preferred embodiment, the shelf lip extends from the outer edge of the shelf member. The device may be constructed of any durable, rigid, lightweight material. It may also have a water resistant covering such as vinyl to facilitate ease of cleaning the device.

Figure 4:
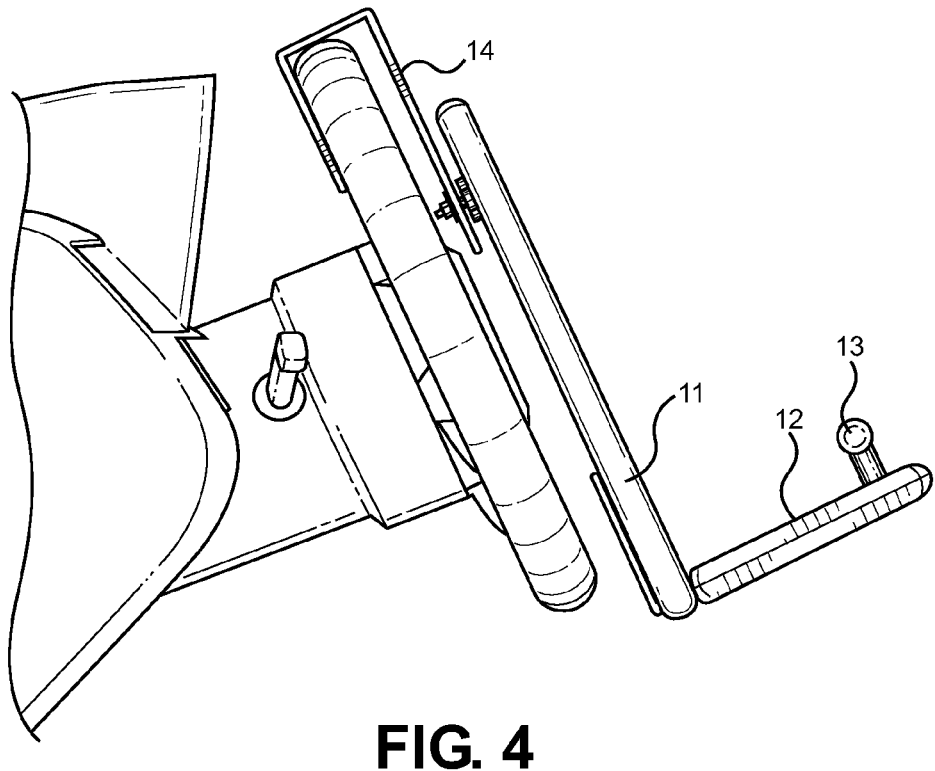
FIG. 4 shows a side view of the article support device according to the present invention, removably secured to a steering wheel.

Referring now to FIG. 4 there is shown side view of the present article support device for an automobile. Securing hooks 14 are placed over the top of an automobile steering wheel 16 such that they rest on top of the same. The rear surface of the supportive body 11 lays in a relatively parallel alignment with the upper surface of an automobile steering wheel, while the device is in use. A shelf member 12 is removably secured along the lower edge of the supporting body and extends outward from the steering wheel. Said shelf member is modular and may be removed and secured to another portion of the supporting body so as to adjust the height of the shelf. The shelf member is perpendicular to the supporting body and its angle of orientation with respect to the horizontal may be adjusted by tilting the steering wheel upwards or downwards. In an alternative embodiment the vertical angle of the shelf with respect to the supporting body and the horizontal is adjustable. In the alternative embodiment including sliding rails, the distance between said supporting body and the top of the automobile steering wheel may be increased or lowered by adjusting the vertical positioning of the sliding rails.

In use an individual places the securing hooks 14 of the device over an upper portion of an automobile steering wheel 16. A user may then place an open book, magazine, tablet computer, or the like against the supportive body 11 such that the lower edge of the item rests on the shelf member 12. In this manner, a user may read a book without having to hold it in his or her hands. Food and drink items may also be placed on the shelf member 12. The shelf lip 13 prevents items from sliding off the outer edge of the shelf 12 and thereby reduces the risk of spills. In the alternate embodiment, a user may adjust the pitch of the shelf 12 in order to create a horizontal surface for setting drinks upon. When not being utilized in a vehicle, the hooks 14 are rotated downward to support for the backing member 11 in an upright, freestanding position on a flat surface.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An article support device for attachment to an automobile steering wheel, comprising:

a supportive backing member having a forward and rear surface and a top and bottom edge;

a shelf member removably secured to said supportive backing member forward surface;

a shelf lip secured along an outer edge of said shelf member, said shelf lip extends perpendicular to said shelf member and parallel to said supportive backing member forward surface;

a plurality of pairs of engagement slots disposed in pairs along said backing member, a first pair being disposed near said top edge, a second pair disposed near said bottom edge, and one or more pairs disposed therebetween;

said shelf member removably secured to said backing member via a plurality of brackets that engage a pair of said engaging slots, wherein said self member is capable of engaging said backing member in an inverted orientation;

a securing means comprising a pair of hooks rotatably and slideably secured to channels within a pair of sliding rails via a pair of wingnuts, and a pair of securing brackets secured within said channels within said sliding rails, and wherein said securing brackets rotatably secure said sliding rails to said supportive backing member rear surface;

said hooks comprising a flat intermediate member joining two members each perpendicular to the flat intermediate member, wherein one of said perpendicular members on each of said hooks is connected to said sliding rails, and wherein said flat members allow the hooks to form a freestanding stand to support the supportive backing member when the flat members are placed upon a flat surface.

2. The device of claim 1, wherein said supportive body has an overall rectangular shape.

3. The device of claim 1, wherein said shelf lip has two upstanding support posts disposed near an outside edge of said shelf member and connected by a crossbar.

4. The device of claim 1, wherein said shelf lip comprises a handle.

5. The device of claim 1, wherein said securing means and said slide rails may be rotated outward and downward to provide a support structure for said supporting body when placed on a flat surface.

6. The device of claim 1, further comprising a set of hook and loop fastening material having a first strip secured to said supporting body front surface, and a second strip of fastener material secured to said shelf member such that said first and second strip engage when saidshelf member is lying flat against said supporting body, providing a stowed configuration for said device.

7. The device of claim 1, wherein said sliding rail is a single channel slide rail.

8. An article support device for attachment to an automobile steering wheel, comprising:
   a supportive backing member having a forward and rear surface, a top and bottom edge, and a plurality of engagement slots disposed in pairs, a first pair being disposed near said top edge, a second pair disposed near said bottom edge, and one or more pairs disposed therebetween;
   a shelf member removably secured to said supportive backing member forward surface via a plurality of brackets that engage a pair of said engaging slots wherein said self member is capable of engaging said backing member in an inverted orientation;
   a shelf lip secured along an outer edge of said shelf member, said shelf lip extends perpendicular to said shelf member and parallel to said supportive backing member member forward surface;
   a securing means comprising a pair of hooks rotatably secured to a pair of sliding rails which are slidably secured to said supportive backing member rear surface via a pair of securing brackets,
   said hooks comprising a flat intermediate member joining two members each perpendicular to the flat intermediate member, wherein one of said perpendicular members on each of said hooks is connected to said sliding rails, and wherein said flat members allow the hooks to form a freestanding stand to support the supportive backing member when the flat members are placed upon a flat surface.

9. The device of claim 8, wherein said securing means may be rotated outward and downward to provide a support structure for said supporting body when placed on a flat surface.

* * * * *